Patented Feb. 16, 1932

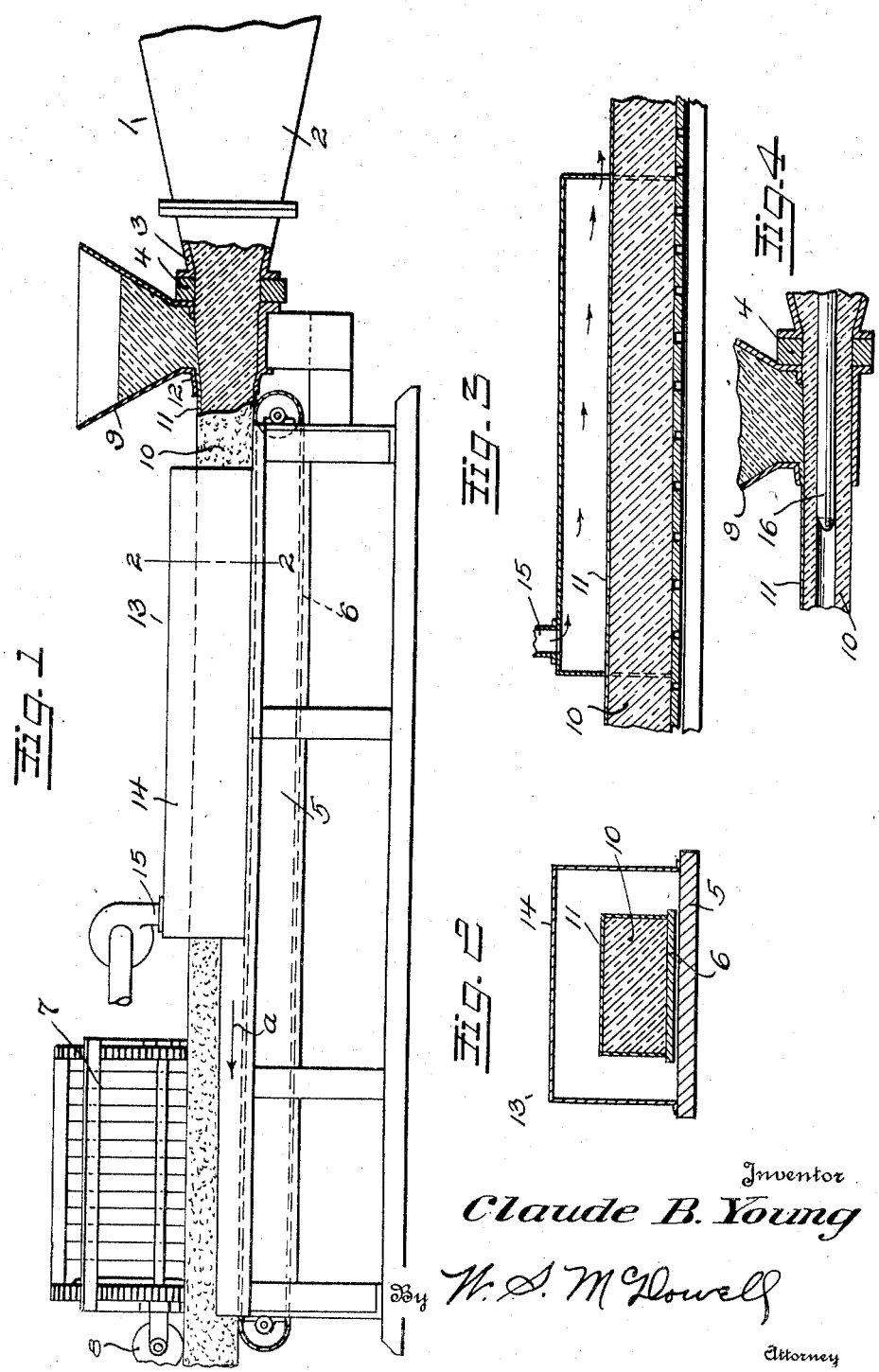

1,845,695

UNITED STATES PATENT OFFICE

CLAUDE B. YOUNG, OF COLUMBUS, OHIO

METHOD OF FACING CLAY BODIES

Application filed December 22, 1930. Serial No. 504,075.

This invention relates to an improved method and apparatus for coating, engobing, veneering or facing one or more surfaces or sides of, for example, a brick or tile clay column as, or after, such a column issues from the extrusion die of a brick forming machine, an important object of the invention being to effect the application of the surfacing material, while the latter is in a relatively soft plastic and sticky condition, to the main body column and then passing the merged column through a heated zone to dry and stiffen the coating or surfacing material so that the latter will not be later ruined or damaged by sliding contact with ordinary brick cutting machinery, by crumbs of the body column falling from this machinery onto the coated surface, by passage under an oil roller or by setting face to face brick on drying cars, or otherwise.

Different methods for coating, engobing or veneering a clay column have been used heretofore in the brick industry, such as the application of the coating or engobe possessing a stiff mud consistency by the use of augers or worms, or by the application of a sticky, plastic slip, coating or an engobe having a soft mud consistency and which is drawn onto the main body column by the forward travel of the column itself immediately following the extrusion of the body column from the brick forming machine. Outstanding difficulties, however, in the use of a soft mud or sticky plastic facing material, are due to the fact that the coated ends of the column, having sliding contact with the cutter guides, are seriously damaged or partially scraped away, and that the brick cannot be placed face to face on drier cars without sticking together and thereby marking or disfiguring the facing of the brick. Furthermore, such a soft surface cannot be rolled and oiled as is customary in stiff mud manufacture and clay crumbs resulting from the cutting of the brick, if dropped upon the soft surfacing material cannot be brushed or blown off to produce finish of desired appearance.

The present invention provides, among other considerations, a process which takes advantage of the ease of application and superior adhering properties of a coating, engobe, veneer or facing of sticky soft mud consistency and wherein this coating, after its application to a stiff mud body column is subjected to a preliminary degree of heat treatment to effect its rapid drying so that it possesses approximately the same consistency as the main body column when the merged column, following such preliminary heating, enters the brick cutting mechanism associated with the extrusion machine, whereby such merged column may be handled and treated with exactly the same facility as an ordinary brick column produced, cut and handled by usual methods and appliances.

I secure these advantages by using a soft, plastic, or sticky facing, at the same time handle the column and brick with the applied facing in the same manner as ordinary stiff mud brick, by passing the merged column, just after the body column has received and taken on its soft mud facing, through a chamber through which is passed heated air or other gases. This heat or circulation of gases in the chamber dries, hardens and stiffens the soft mud facing or engobe to such a consistency that the merged column, with its engobe or veneer, may be passed through the cutting or other machinery ordinarily used in brick manufacture, without damage to the engobe or veneer. In this process the soft yielding engobe or veneer becomes dried, hardened and stiffened according to the amount of heat or circulation of air or both and in proportion to the time, or to the length of the chamber through which the column passes and the rate of movement of the column through said chamber. These factors are subject to adjustment to secure the best consistency or working conditions in accordance with the physical characteristics of the clays comprising such merged column. These conditions however should be such as to stiffen the surfacing material during the passage of the latter through the chamber to such consistency, that the engobe or veneer will resist without damage or other deleterious influences sliding contact with cutting machinery or contact with oiled smoothing rolls or the handling and placing of such brick in customary settings on drier cars, and, also to permit small clay particles or crumbs from the brick body, that may fall upon the surface column, to be brushed or blown off without injury to the column.

For a further understanding of the invention, reference is to be had to the following description and the accompanying drawings, wherein:

Figure 1 is a view partially in side elevation in vertical cross section illustrating the apparatus used in connection with the present invention, Figure 2 is a transverse cross sectional view on the line 2—2 of Figure 1, Figure 3 is a vertical longitudinal sectional view taken through the slip or engobe drier, and Figure 4 is a similar view taken through the brick forming apparatus disclosing the use of cores for producing openings in the clay body.

Referring more particularly to the drawings, the numeral 1 designates a brick forming machine of standard construction which includes the usual barrel 2 containing a power driven auger (not shown) for forcing clay of stiff mud consistency through the outlet head 3 of said machine which contains a column forming extrusion die 4. The shape of the die, as usual, produces a clay column of elongated form having the cross sectional formation and area of ordinary brick.

Disposed in longitudinal alignment with the machine 1 and in registration with die 4 thereof is a frame 5 which constitutes a bed for the support of a conveyor belt 6 and the upper run of this belt, which receives the clay, as the latter is extruded from the die 4, is driven in the direction indicated by the arrow a at a desired rate of travel to convey the column from the forming machine to the wire cutting reel 7, which is mounted in conjunction with the frame 5 adjacent to the discharge end of the belt 6. It will be understood that the reel 7 operates intermittently, in the ordinary manner, to cut the brick column longitudinally into desired brick lengths, widths or thicknesses. Also mounted on the frame 5 to the rear of the cutting reel 7 is a vertically placed roller 8 of customary design which smooths the brick immediately prior to the removal thereof from the frame 5, and the placing of the brick in settings on drier cars. Ordinarily, oil is applied to the surface of the roller 8 to prevent sticking.

In manufacturing brick in accordance with the present invention, the frame 5 carries, adjacent to the discharge end of the die 4 a shallow open topped hopper 9 which is placed immediately above the belt 6. The facing or engobe material, possessing a consistency of soft mud and therefore differing from the consistency of the stiff mud brick column 10, which is extruded from the die 4, is placed either by hand or automatic machinery in the hopper 9 so that the facing material will directly contact with one, two or three sides of the column 10. Due to the soft sticky condition of the facing material, which is indicated at 11, the latter readily adheres to the surfaces of the column 10 with which it comes into contact. The lower portion of the hopper 9 is formed of inclined walls 12 which terminate in properly spaced relationship from the body column 10 to regulate the thickness of the stratum or strata of facing material applied to the body column which ordinarily is nothing more than a thin wafer like coating. Usually, the facing material is formed from a superior grade of clay than that used in the body column but this condition need not necessarily obtain and usually, the facing material is employed to impart to the finished brick an appearance of an improved character, or, at least, different from the appearance or effect produced by brick consisting solely of the materials contained in the body column. I am aware of the fact that it has been proposed heretofore to apply a coating or engobe of this character to brick, as indicated in the patent to Ramsey, 685,410, October 29, 1901, and therefore do not claim broadly this operation, since the present invention deals more particularly with the handling of clay columns of stiff mud consistency to which a soft coating or engobe has been applied whereby to expedite the manufacture of such products and to reduce the percentage of loss or waste products attributable to inferior handling thereof.

Heretofore it has been customary to pass the merged brick column, that is the combined body and facing columns, directly along the belt and into contact or registration with the guides of the cutting mechanism. Due to the soft plastic state of the facing material, the faced brick material has been mutilated and a large percentage of waste incurred by the frictional rubbing of the face brick column on stationary guides and the deposit of small clay particles on the soft facing material 11 and furthermore, after cutting, it has been necessary to carefully handle the brick so that the soft faces will not be brought into physical contact with each other during the placing of the brick on drier cars. To overcome these objections, among many others, I have provided the frame 5 immediately to the rear of the hopper 9 with a preliminary drier 13. This drier surrounds the merged brick column and overlies the belt 6 between the hopper 9 and the cutting mechanism. The drier in the form of the invention illustrated comprises a casing 14, the stationary sides of which being spaced from the brick column passing through the casing on the belt 6.

Near the discharge end of the casing 14, there is provided a blower unit 15, which is employed to supply the interior of the casing with a current of heated gaseous fluid which possesses a temperature sufficiently high to effect the drying of the facing material 11 to a desired degree of permanency during the passage of the column through said drier. It will be appreciated that this result can be obtained through the employment of several factors, for example, by varying the temperature, the velocity of heating gases through the casing and the relative humidity of the gaseous heating fluid, by varying the length of the casing 14 and/or by varying the rate of travel of the conveyor belt. In any event, it is the object of this step of my process to dry, stiffen or harden the facing material so that by the time it is discharged from the preliminary drier or by the time it reaches the cutting mechanism, the said facing material will possess a consistency of approximately that of stiff mud or in other words in approximately the same condition with respect to consistency as the body column 10.

Therefore, by the provision of this supplemental or intermediate heating step, I accelerate the rate of drying of the soft mud facing material so that the latter rapidly assumes the consistency of stiff mud and by this step the merged column, composed of body and facing materials assume such a consistency that the column may be handled in the ordinary manner now employed in the handling of brick columns formed solely from clays of stiff mud consistency. Thus the veneered brick may be cut, clay crumbs blown or brushed therefrom, it may be rolled in oil, removed from the brick forming machine either by manual or automatic operations and placed face to face on drier cars in ordinary settings. Therefore by the provision of this method, brick manufacturers are enabled to produce a veneered or slip brick at approximately the same cost, speed and facility as ordinary clay brick formed solely from clay materials possessing a stiff mud consistency.

While I have described the invention as being particularly applicable to the manufacture of brick, nevertheless it will be understod that I do not intend to limit my invention to the field of brick production alone since it is obvious that the invention may also be practiced in the formation of other clay bodies such as in the manufacture of tile and analogous ceramic products. In certain types of brick or tile it is customary to provide the body column with cored openings and, as shown in Fig. 4, where products of this type are being produced, I extend the cores 16 used in forming these openings from the die 4 to a position below the slip applying hopper 9 and by this arrangement the form of the body column is maintained constant during the application of the coating material and distortion of the body column, during such step, is precluded. It will be understood that the hopper 9 and its walls 12 are of such form that the facing material may be applied to both the top and sides of the body column or to anyone of such surfaces, depending upon the uses to which the completed products are to be placed. Certain bricks or tile for example require merely the finishing or application of facing material to but one surface whereas other brick or tile require the finishing of two or more surfaces. Where the sides of the brick receive facing materials, the present invention has particular application since it is these side surfaces which receive the greater finish destroying forces when ordinary practices are employed. By the present invention, the intermediate drier 13 hardens the facing material immediately on these sides surfaces as well as on the upper surface so that when the side surfaces engage with the guides of the cutting mechanism, they will posses a sufficient degree of hardness to withstand without marring or disturbing the finish, rubbing contact with the cutter guides or other stationary surfaces.

In summary, the sticky or soft plastic mass comprising the facing material adheres permanently to the body column practically on contact therewith, but little pressure being required to effect permanent union therewith. To obtain brick of good mechanical quality and shape and employing the stiff mud process of making and cutting an extruded clay column into brick, the column should be extruded in a fairly hard condition and the engobe, coating or facing when in a soft sticky condition will readily unite with such a body column, producing bricks correct in shape and form with but slight loss due to structural imperfections. A stiff mud coating, engobe or facing, which has also been proposed heretofore, does not easily unite with a corresponding body column even under conditions of high pressure secured by the use of specially built machines. I have therefore found it necessary in order to secure proper adhesion that the engobe possess a rather soft condition. While a soft facing material readily unites with the body column to produce finished brick which when dried and fired will possess a composite character wherein the facing or engobe will not crack, chip or peel off, I have found it is necessary in order to produce such a brick economically, and without excessive loss or lowering of quality standards, to employ the preliminary drying step ahead of the cutting mechanism. So far as I am aware, this step has never heretofore been utilized in the manufacture of brick, tile or other similar ceramic products. The process has the advantage of being readily applied to ordinary machinery employed in the manufacture of brick consisting solely of materials of stiff mud consistency. The hopper 9 and the drier 13 may be applied to standard brick forming machinery, without interfering in any way with their construction, manner or speeds of operation and thus a manufacturer at a low cost may equip the present machinery to produce the veneered product. This is in distinct contrast with brick heretofore formed from two columns of clay in which both columns possess a stiff mud consistency.

It will be understood that by the term "facing materials", I use this expression to include such materials known in the industry as slips, engobes, veneering, facings and the like. The expression "soft mud consistency" refers to a clay or clay containing materials with which sufficient water is mixed to impart to that clay a plastic or an adhesive state whereby such a clay readily adheres to any surface with which it may come in contact. It will be further understood that the facing materials may be formed from a wide variety of clays and either artificially or naturally colored to impart a desired appearance to the finished product. By the expression "stiff mud consistency", I refer to an expression commonly used in the brick industry with reference to a clay forced under high pressure through an extrusion die and deprived more largely of its water content. Such a clay does not readily adhere to surfaces with which it may come in contact and is in a friable character in that it may be broken and definitely separated into lumps or particles of definite form. In the event the stiff mud column is formed with body openings to lighten the weight of the brick or tile formed thereby, fingers may extend from the extrusion die under the slip applying hopper in order that the stiff mud column may be supported at the time of the application of the slip or facing material.

What is claimed is:

1. The process of applying a soft, sticky, plastic surfacing material to a moving stiff mud body, accelerating the hardening and stiffening of the surfacing material by passing the merged column through a heating zone immediately following the application of the surfacing material to the body column, maintaining said merged column in said heating zone for a sufficient period whereby to dry the facing material to a consistency approximately that of stiff mud, and directly upon the discharge of the merged column from said heating zone cutting said column longitudinally into bodies of desired length.

2. The process of producing faced brick which consists in continuously extruding a brick forming clay column of stiff mud consistency, continuously applying to at least one of the surfaces of such column a clay facing material possessing a soft mud consistency, said facing material being applied to the body column in the form of a thin layer, then without interrupting the movement of said column subjecting said column and the facing material applied thereon to elevated temperatures whereby to accelerate the hardening of said facing material and then without interrupting the continuous advance of the column subjecting the same to a cutting operation whereby to sever the column into bodies of desired length.

3. The process of producing coated clay products, which comprises continuously applying and coating a clay column of soft mud consistency to at least one of the surfaces to a constantly advancing extruded clay column of stiff mud consistency, and subjecting the merged column, without interrupting the movement thereof to relatively elevated temperatures to effect the drying of the coating material so that it possesses a consistency approximately that of the stiff mud body column.

4. The process of producing coated products, which comprises continuously applying a coating of soft mud consistency to at least one of the surfaces of a constantly advancing extruded clay column of stiff mud consistency, subjecting the merged column, without interrupting the movement thereof to relatively elevated temperatures to effect the drying of the coating material so that it possesses a consistency approximately that of the stiff mud body column, and then cutting the merged column immediately following the drying of the coating material into bodies of desired length.

5. The method of producing coated brick which comprises the steps of producing a clay body column of stiff mud consistency, advancing said column along a way, applying a clay coating of soft mud consistency continuously to at least one of the surfaces of said body, during its passage along said way, accelerating the rate of drying of the coating material so that said coating material possesses a consistency approximately that of the body column while the latter is travelling along said way, then severing the merged column into brick lengths, rolling the severed brick and removing the brick from the way.

6. The method of producing coated brick which comprises the steps of producing a clay body column of stiff mud consistency, advancing said column along a way, applying a coating of soft mud consistency continuously to at least one of the surfaces of said body during its passage along said way, and accelerating the rate of drying of the coating material so that said coating material possesses a consistency approximately that of the body column while the latter is travelling along said way.

7. The method of producing coated brick which comprises the steps of producing a clay body column of stiff mud consistency, advancing said column along a way, applying a coating of soft mud consistency continuously to at least one of the surfaces of said body, during its passage along said way, accelerating the rate of drying of the coating material so that said coating material possesses a consistency approximately that of the body column while the latter is travelling along said way, and then severing the merged column into brick lengths.

8. The process of producing coated products, which comprises continuously applying a coating of soft mud consistency to at least one of the surfaces of a constantly advancing extruded clay column of stiff mud consistency, subjecting the merged column, without interrupting the movement thereof, to a current of heated gases to effect the drying of the coating material so that it possesses a consistency approximately that of the stiff mud body column, and then cutting the merged column immediately upon leaving said air current into bodies of desired length.

In testimony whereof I affix my signature.

CLAUDE B. YOUNG.